3,475,457
FLUORINATED 1,3-DIOXOLANES AND PROCESS
FOR THEIR PREPARATION
Dario Sianesi and Adolfo Pasetti, Milan, and Franco
Tarli, Rome, Italy, assignors to Montecatini Edison
S.p.A., Milan, Italy
No Drawing. Filed Dec. 6, 1966, Ser. No. 599,393
Claims priority, application Italy, Dec. 10, 1965
27,481/65
Int. Cl. C07d 13/04
U.S. Cl. 260—340.9                                   5 Claims

ABSTRACT OF THE DISCLOSURE

The present invention pertains to a new class of heterocyclic compounds of the formula:

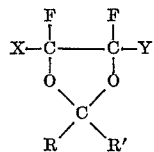

wherein X and Y are the same or different and are selected from the group formed by F, Cl and the fluorinated alkyl radicals having the formula —$C_nF_{2n+1}$ or the formula $H(CF_2)_{n-}$, where $n$ is a number comprised between 1 and 10, R and R' are the same or different and are selected from the group formed by hydrogen, by the linear or branched alkyl radicals containing from 1 to 10 carbon atoms and from the aryl, alkylaryl, and arylalkyl radicals, occasionally containing atoms or substituting groups without active hydrogen atoms, and the preparation thereof. The compounds have miscellaneous uses.

DESCRIPTION

Our invention pertains to a new class of fluorinated heterocyclic compounds and a process for the preparation thereof. The compounds are prepared by reaction of an epoxide of a fluoroolefin with a carbonyl compound. In particular, the invention refers to a class of fluorinated 1,3-dioxolanes obtainable by reaction of organic substances containing the carbonyl group with the epoxides of fluorinated olefins, especially the epoxides of the perfluoro-alpha-olefins.

The epoxides of the perfluoro-alpha-olefins are easily obtainable substances. For instance, the epoxides of perfluoropropylene can be prepared by electrochemical fluorination of

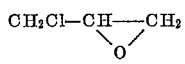

or direct epoxidation of perfluoropropylene, with either $H_2O_2$ or with molecular oxygen under the action of electromagnetic radiations. Up to now, of these perfluorinated epoxides were known oligomerization reactions (Belgian Patent No. 616,756) and reactions of addition to fluorides of perfluorinated acid (U.S. Patent No. 3,114,778), which allow to obtain perfluorinated ethers and polyethers with end acid groups. A pyrolytic reaction with thiocarbonyl compounds (U.S. Patent No. 3,136,744) for the synthesis of cyclic fluorinated sulphides is also known. A copending application describes the reactions of perfluorinated epoxides with various both organic and inorganic reactants containing active hydrogen atoms (U.S. application Ser. No. 562,527, filed July 5, 1966). These reactions make it possible to obtain different alpha-substituted fluorinated carboxylic acid derivatives. For instance, from the epoxide of perfluoro-propylene, compounds which are perfluoropropionic acids mono- and di-substituted in the alpha-position have been obtained.

We have now found, and this is an object of our invention, that, under suitable reaction conditions, a fluorinated epoxide can react with substances containing a carbonyl group, causing the formation of new fluorinated organic substances having a cyclic structure. The invention thus relates to a new class of heterocyclic compounds of the formula:

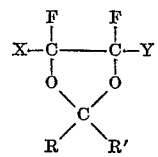

wherein X and Y are the same or different and are selected from the group formed by F, Cl and the fluorinated alkyl radicals having the formula —$C_nF_{2n+1}$ or the formula $H(CF_2)_{n-}$, where $n$ is a number comprised between 1 and 10, R and R' are the same or different and are selected from the group formed by hydrogen, by the linear or branched alkyl radicals containing from 1 to 10 carbon atoms and from the aryl, alkylaryl, and arylalkyl radicals, occasionally containing atoms or substituting groups without active hydrogen atoms, and the preparation thereof.

According to our process, a fluorinated epoxide of the formula

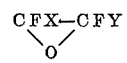

is reacted with an R–CO–R' carbonyl compound, wherein X, Y, R and R' have the above-defined meaning, at a temperature comprised between —80° C. and +200° C., and preferably between —30° C. and +100° C., at autogenous pressure. The reaction between the fluorinated epoxide and the carbonyl substance is carried out by contacting the two selected reactants in the absence or presence of a diluting liquid. The pressure in the reaction system must be the autogenous pressure of the system at the selected temperature and preferably at least one of the two reagents is kept in the liquid state. Any liquid substance not taking part in the reaction and preferably one in which both reactants are soluble can be chosen as the diluent. Suitable liquid media for this purpose are, for instance, ethers, such as ethyl ether, dioxane, tetrahydrofuran, esters, halogenated hydrocarbons, such as $CH_2Cl_2$, $CHCl_3$, $CCl_4$, $CF_2Cl$—$CFCl_2$, etc. It is particularly useful to use an excess of the same carbonyl compound used as reactive substance as the solvent, if at the reaction conditions it is in the liquid state.

Generally, the reaction between a fluorinated epoxide and a carbonyl compound proceeds, under the described conditions, at a satisfactory rate, giving rise to the formation of good yields of the desired product. The use, therefore, of special catalysts is not strictly necessary. However, the use of particular agents which can further increase the above reaction rate is within the contemplation of the present invention. These agents can consist, for instance, of radical or ionic type catalysts, ultraviolet light or, generally, electromagnetic radiations.

Using, under the above-mentioned conditions, the epoxide of perfluoropropylene as the starting fluorinated epoxide and an aliphatic ketone as the carbonyl compound, particularly preferred products are obtained. The new compounds thus obtained have a structure which can be expressed by the formula

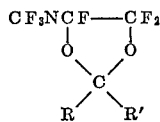

wherein R and R' are alkyl groups. Therefore, they are 2,2-dialkyl-4-trifluoromethyl - 4,5,5 - trifluoro-1,3-dioxolanes. All of these new compounds have a neutral character and exhibit a good resistance to hydrolysis, both in strongly acid and in strongly alkaline media. The compounds have good dissolving properties both in comparison with many fluorinated substances and in comparison with non-fluorinated substances.

They can be used in various fields of application; in particular, they can serve as solvents, plasticizers, etc. in those cases where it is necessary to keep fluorinated and non-fluorinated substances simultaneously in a homogeneous phase. Moreover, as they can undergo further chemical transformations, they represent intermediates for the synthesis of various new chemical compounds of wide fields of application.

Some specific examples of the invention follow. The structure of the new compounds is in accordance with the centesimal analysis, the IR absorption spectra, the nuclear magnetic resonance spectra and with the values determined for the molecular weights.

EXAMPLE 1

100 cc. of dry acetone and 22.2 g. of perfluoropropylene epoxide are introduced into a glass vial having a capacity of 200 cc. The vial is then sealed and kept at $-30°$ C. for three days and then at room temperature for three additional days. Thereafter it is opened, and the contents are poured into 1,000 cc. of water. The heavy oily phase (18.2 g.) is separated and dried on $Na_2SO_4$ and the crude product thus obtained is subjected to fractional distillation. 11.5 g. of 2,2-dimethyl - 4 - trifluoromethyl-4,5,5-trifluoro-1,3-dioxolane, which boils at 84°–85° C., are obtained.

0.15 g. of the thus obtained product are introduced together with 150 cc. of ethanol and 50 cc. of water into a small flask provided with a reflux condenser. The solution is boiled under reflux for 3 hours after which it is observed that the $F^-$ ions are absent from the solution. Thus the good resistance to hydrolysis of the product described is demonstrated.

The test was repeated twice more, boiling under reflux for 3 hours a sample (0.15 g.) of 2,2-dimethyl-4-trifluoromethyl-4,5,5-trifluoro-1,3-dioxolane, the first time with 150 cc. of ethanol and 50 cc. of aqueous NaOH 10 N, and the second time with 150 cc. of ethanol and 50 cc. of aqueous HCl 10 N. In these two cases also, the amount of $F^-$ ions in the final solution is negligible.

EXAMPLE 2

50 cc. of methylethylketone and 20.3 g. of perfluoropropylene epoxide are introduced into a vial having a 100 cc. capacity. The vial is then sealed and kept at a temperatur of 30° C. for 10 days, after which it is opened, and the contents poured into water. The heavy oily phase is separated and repeatedly washed with water; after drying on $Na_2SO_4$, it is subjected to fractional distillation. Thus 8.0 g. of 2-methyl-2-ethyl-4-trifluoromethyl-4,5,-trifluoro-1,3-dioxolane, which boils at 106° C., are obtained.

EXAMPLE 3

Employing the same process as described in Example 2, 50 cc. of diethylketone and 21.1 g. of perfluoropropylene epoxide are reacted. The vial is kept at 60° C. for 5 days. The subsequent purification operations are conducted in the same way as in Example 2. 5.0 g. of 2,2-diethyl-4-trifluoromethyl-4,5,5-trifluoro-1,3-dioxolane, which boils at 126° C., are obtained.

EXAMPLE 4

Employing the same process as described in Example 2, 50 cc. of methyl-isobutyl ketone and 17.3 g. of perfluoropropylene epoxide are reacted. The vial is kept at room temperature for 30 days. The subsequent purification operations are analogous to those of Example 2, 4.7 g. of 2-methyl-2-isobutyl-4-trifluoromethyl - 4,5,5 - trifluoro-1,3-dioxolane, which boils at 134° C., are obtained.

The products of Examples 2–4 were also boiled under reflux as in Example 1. None of the products showed a tendency to hydrolyze.

We claim:
1. A compound having the formula:

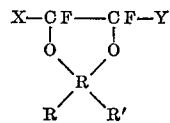

wherein X is selected from the group consisting of F, $CF_3$ and $CF_2H$ and Y is selected from the group consisting of F and Cl and R and R' are the same or different and are selected from the group consisting of hydrogen and an alkyl containing from 1 to 10 carbon atoms.

2. The compound of claim 1, which is 2,2-dimethyl-4-trifluoromethyl-4,5,5-trifluoro-1,3-dioxolane.

3. The compound of claim 1, which is 2,2-diethyl-4-trifluoromethyl-4,5,5-trifluoro-1,3-dioxolane.

4. The compound of claim 1, which is 2-methyl-2-isobutyl-4-trifluoromethyl-4,5,5-trifluoro-1,3-dioxolane.

5. The compound of claim 1, which is 2-methyl-2-ethyl-4-trifluoromethyl-4,5,5-trifluoro-1,3-dioxolane.

References Cited

UNITED STATES PATENTS 3,324,145  6/1967  Madison _____ 260—340.9

ALEX MAZEL, Primary Examiner

J. H. TURNIPSEED, Assistant Examiner

U.S. Cl. X.R.

106—311; 204—59, 81, 158; 260—30.4, 348, 348.5, 539